(12) United States Patent
Burke et al.

(10) Patent No.: US 10,562,357 B2
(45) Date of Patent: Feb. 18, 2020

(54) ROTARY JOINT AIR COLLECTOR RING AND THE TIRE INFLATION SYSTEM MADE THEREWITH

(71) Applicant: Dana Heavy Vehicle Systems Group, LLC, Maumee, OH (US)

(72) Inventors: Douglas C. Burke, Deerfield, MI (US); William J. Foor, Clayton, MI (US); Christopher P. Lewark, Grand Rapids, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 702 days.

(21) Appl. No.: 15/178,690

(22) Filed: Jun. 10, 2016

(65) Prior Publication Data
US 2016/0361957 A1 Dec. 15, 2016

Related U.S. Application Data

(60) Provisional application No. 62/174,988, filed on Jun. 12, 2015, provisional application No. 62/174,627, filed on Jun. 12, 2015.

(51) Int. Cl.
*B60C 23/00* (2006.01)
*B60B 27/00* (2006.01)

(52) U.S. Cl.
CPC ........ *B60C 23/003* (2013.01); *B60B 27/0047* (2013.01); *B60C 23/004* (2013.01); *B60B 27/0073* (2013.01); *B60B 2900/351* (2013.01)

(58) Field of Classification Search
CPC .. B60C 23/003; B60C 23/004; B60B 27/0047
See application file for complete search history.

(56) References Cited

U.S. PATENT DOCUMENTS

| | | | |
|---|---|---|---|
| 1,112,596 A | 10/1914 | Burggraf, Jr. | |
| 1,772,212 A | 8/1930 | Daneel | |
| 2,156,841 A | 5/1939 | Davis | |
| 2,236,235 A | 3/1941 | Head | |
| 2,242,207 A * | 5/1941 | Bowers | B60C 23/003 152/415 |
| 2,715,430 A | 8/1955 | Lindeman | |
| 3,114,579 A | 12/1963 | Isenbarger | |

(Continued)

FOREIGN PATENT DOCUMENTS

| | | |
|---|---|---|
| WO | 03037662 A1 | 5/2003 |
| WO | 2004080729 A2 | 9/2004 |

(Continued)

OTHER PUBLICATIONS

International Search Report and Written Opinion for Application No. PCT/US2014/023176, dated Sep. 18, 2014, issued by the European Patent Office.

*Primary Examiner* — Scott A Browne
(74) *Attorney, Agent, or Firm* — Marshall & Melhorn, LLC

(57) ABSTRACT

An assembly for a tire inflation system including a spindle having a fluid conduit. The spindle is coupled with a rotary joint spindle, and the rotary joint spindle includes a fluid conduit in fluid communication with the spindle fluid conduit. A fluid collector ring is located about the rotary joint spindle such that the fluid collector ring may rotate. The fluid collector ring is also in fluid communication with the rotary joint spindle fluid conduit.

12 Claims, 7 Drawing Sheets

(56) References Cited

U.S. PATENT DOCUMENTS

| | | |
|---|---|---|
| 3,259,404 A | 7/1966 | Papenguth |
| 3,276,503 A | 10/1966 | Klimarx |
| 3,829,104 A | 8/1974 | Green |
| 3,855,383 A | 12/1974 | Dahlgren |
| 3,858,950 A | 1/1975 | Otto |
| 3,879,001 A | 4/1975 | Schovee |
| 4,026,183 A | 5/1977 | Bart |
| 4,073,540 A | 2/1978 | Jackowski |
| 4,154,279 A | 5/1979 | Tsuruta |
| 4,191,389 A | 3/1980 | Jelinek |
| 4,251,082 A | 2/1981 | Little |
| 4,282,949 A | 8/1981 | Kopich et al. |
| 4,434,833 A | 3/1984 | Swanson et al. |
| 4,448,461 A | 5/1984 | Otto |
| 4,470,506 A | 9/1984 | Goodell et al. |
| 4,492,019 A | 1/1985 | Wells et al. |
| 4,582,107 A | 4/1986 | Scully |
| 4,641,698 A | 2/1987 | Bitonti |
| 4,834,464 A | 5/1989 | Frehse |
| 4,844,138 A | 7/1989 | Kokubu |
| 4,883,106 A | 11/1989 | Schultz et al. |
| 4,895,199 A | 1/1990 | Magnuson et al. |
| 4,921,258 A | 5/1990 | Fournier et al. |
| 4,932,451 A | 6/1990 | Williams et al. |
| 5,174,839 A | 12/1992 | Schultz et al. |
| 5,203,391 A * | 4/1993 | Fox ............... B60C 23/003 152/415 |
| 5,217,137 A | 6/1993 | Andrews |
| 5,236,028 A | 8/1993 | Goodell et al. |
| 5,240,039 A | 8/1993 | Colussi et al. |
| 5,287,906 A | 2/1994 | Stech |
| 5,328,275 A | 7/1994 | Winn et al. |
| 5,377,736 A | 1/1995 | Stech |
| 5,429,167 A | 7/1995 | Jensen |
| 5,482,358 A | 1/1996 | Kuck |
| 5,505,525 A | 4/1996 | Denton |
| 5,524,904 A | 6/1996 | Willi et al. |
| 5,538,330 A | 7/1996 | Ehrlich |
| 5,584,949 A | 12/1996 | Ingram |
| 5,658,053 A | 8/1997 | Vencill et al. |
| 5,752,746 A | 5/1998 | Perry |
| 5,769,979 A | 6/1998 | Naedler |
| 5,785,390 A | 7/1998 | Gold et al. |
| 5,860,708 A | 1/1999 | Borders et al. |
| 5,868,881 A | 2/1999 | Bradley |
| 5,904,427 A | 5/1999 | Braun et al. |
| 5,979,526 A | 11/1999 | Chamoy |
| 5,997,005 A | 12/1999 | Gold et al. |
| 6,105,645 A | 8/2000 | Ingram |
| 6,145,558 A | 11/2000 | Schmitz |
| 6,145,559 A | 11/2000 | Ingram, II |
| 6,158,743 A | 12/2000 | Anderson et al. |
| 6,199,611 B1 | 3/2001 | Wernick |
| 6,244,316 B1 | 6/2001 | Naedler |
| 6,260,595 B1 | 7/2001 | Cobb |
| 6,269,691 B1 | 8/2001 | Sowatzke et al. |
| 6,273,519 B1 | 8/2001 | Tsou |
| 6,283,186 B1 | 9/2001 | Krisher |
| 6,290,235 B1 | 9/2001 | Albertson |
| 6,325,124 B1 | 12/2001 | Colussi et al. |
| 6,334,791 B1 | 1/2002 | Yeh |
| 6,394,159 B1 | 5/2002 | Cobb |
| 6,425,427 B1 | 7/2002 | Stech |
| 6,435,238 B1 | 8/2002 | Hennig |
| 6,439,044 B1 | 8/2002 | Tigges |
| 6,447,072 B1 | 9/2002 | Johnson |
| 6,484,774 B1 | 11/2002 | Naedler |
| 6,488,342 B1 | 12/2002 | De Paiva |
| 6,575,028 B2 | 6/2003 | Colussi et al. |
| 6,698,482 B2 | 3/2004 | Hennig et al. |
| 6,719,028 B2 | 4/2004 | D'Amico et al. |
| 6,783,191 B1 | 8/2004 | Slesinski et al. |
| 6,871,683 B2 | 3/2005 | Cobb |
| 7,117,909 B2 | 10/2006 | Jarrett et al. |
| 7,185,688 B2 | 3/2007 | Hayes et al. |
| 7,207,365 B2 * | 4/2007 | Nelson ............... B60C 23/003 152/415 |
| 7,302,979 B2 | 12/2007 | Davison et al. |
| 7,306,020 B2 | 12/2007 | Beverly et al. |
| 7,488,046 B2 * | 2/2009 | Vignotto ............... B60C 23/003 152/415 |
| 7,686,313 B2 | 3/2010 | Fogler et al. |
| 7,690,412 B1 | 4/2010 | Jenkinson et al. |
| 7,762,372 B2 | 7/2010 | LeBlanc, Sr. et al. |
| 7,896,045 B2 | 3/2011 | Solie et al. |
| 7,931,061 B2 | 4/2011 | Gonska et al. |
| 7,963,159 B2 | 6/2011 | Ingram et al. |
| 7,967,045 B2 | 6/2011 | Jenkinson et al. |
| 7,975,739 B1 | 7/2011 | Ingram |
| 7,997,316 B2 | 8/2011 | Walter et al. |
| 8,002,237 B2 | 8/2011 | Hubacek et al. |
| 8,028,732 B1 | 10/2011 | Ingram et al. |
| 8,051,940 B2 | 11/2011 | Ziech |
| 8,052,400 B2 | 11/2011 | Isono |
| 8,069,890 B2 | 12/2011 | Resare et al. |
| 8,191,594 B2 | 6/2012 | Saadat |
| 8,397,774 B2 | 3/2013 | Gnoska et al. |
| 8,453,692 B2 | 6/2013 | Saadat |
| 8,505,600 B2 | 8/2013 | Padula et al. |
| 8,746,305 B2 | 6/2014 | Lloyd |
| 8,915,274 B2 | 12/2014 | Eschenburg et al. |
| 8,981,919 B2 | 3/2015 | Massey et al. |
| 8,997,336 B2 | 4/2015 | Strizki et al. |
| 9,132,704 B2 | 9/2015 | Wilson et al. |
| 9,221,308 B2 | 12/2015 | Nelson et al. |
| D749,482 S | 2/2016 | Schroeder et al. |
| 9,290,044 B2 | 3/2016 | Leung |
| 2003/0080862 A1 | 5/2003 | Kranz |
| 2005/0133134 A1 | 6/2005 | Ingram et al. |
| 2005/0257872 A1 | 11/2005 | Szykulski |
| 2008/0185086 A1 | 8/2008 | Ingram et al. |
| 2009/0283190 A1 * | 11/2009 | Padula ............... B60C 23/003 152/417 |
| 2012/0024445 A1 * | 2/2012 | Wilson ............... B60C 23/003 152/415 |
| 2012/0318422 A1 | 12/2012 | Lloyd |
| 2013/0087262 A1 | 4/2013 | Hennig |
| 2013/0199685 A1 * | 8/2013 | Nelson ............... B60C 29/00 152/415 |
| 2014/0076456 A1 | 3/2014 | Kranz |
| 2014/0261941 A1 | 9/2014 | Knapke et al. |
| 2015/0180188 A1 | 6/2015 | Strizki et al. |
| 2016/0016443 A1 | 1/2016 | Morgan |
| 2017/0080760 A1 * | 3/2017 | Foor ............... B60C 23/003 |

FOREIGN PATENT DOCUMENTS

| | | |
|---|---|---|
| WO | 2013119498 A2 | 8/2013 |
| WO | 2013119634 A1 | 8/2013 |
| WO | 2014047240 A2 | 3/2014 |

\* cited by examiner

ROTARY JOINT AIR COLLECTOR RING AND THE TIRE INFLATION SYSTEM MADE THEREWITH

RELATED APPLICATIONS

The present application claims the benefit to U.S. Provisional Application Nos. 62/174,627 and 62/174,988 filed on Jun. 12, 2015, which are incorporated herein by reference in their entirety.

BACKGROUND OF THE INVENTION

This disclosure relates to tire inflation systems and more particularly to an air collector ring in a steer axle wheel end rotary joint utilized in a tire inflation system.

Tire inflation systems for vehicles provide a vehicle the versatility of adjusting tire pressures while the vehicle is stationary or in motion. For example, the tire pressure of one or more wheel assemblies in fluid communication with a tire inflation system may be decreased to increase tire traction, or increased to reduce rolling resistance and increase the vehicle's fuel efficiency and tire life-span. In addition, tire inflation systems increase a vehicle's maneuverability over differing terrains and reduce maintenance requirements.

Tire inflation systems often employ a rotary joint assembly to permit the rotating portions and non-rotating portions of the vehicle to communicate pressurized fluid effectively. Pressure can develop adjacent the rotary joint assembly and this pressure can create a failure in or near the tire inflation system.

SUMMARY

The present subject matter relates to an assembly for a tire inflation system including a spindle having a fluid conduit in selective fluid communication with an air supply. The spindle is coupled with a rotary joint spindle, and the rotary joint spindle includes a fluid conduit in fluid communication with the spindle fluid conduit. A fluid collector ring is located about the rotary joint spindle such that the fluid collector ring may rotate. The fluid collector ring is also in fluid communication with the rotary joint spindle fluid conduit. A port in the fluid collector ring is fluid communication the rotary joint spindle and a wheel valve assembly.

BRIEF DESCRIPTION OF THE SEVERAL VIEWS OF THE DRAWINGS

The accompanying drawings, incorporated herein as part of the specification, illustrate the presently disclosed subject matter, and with the description, serve to explain the principles of the disclosed subject matter and to enable a person skilled in the pertinent art to make and use the disclosed subject matter.

DETAILED DESCRIPTION OF THE INVENTION

Figure 1:
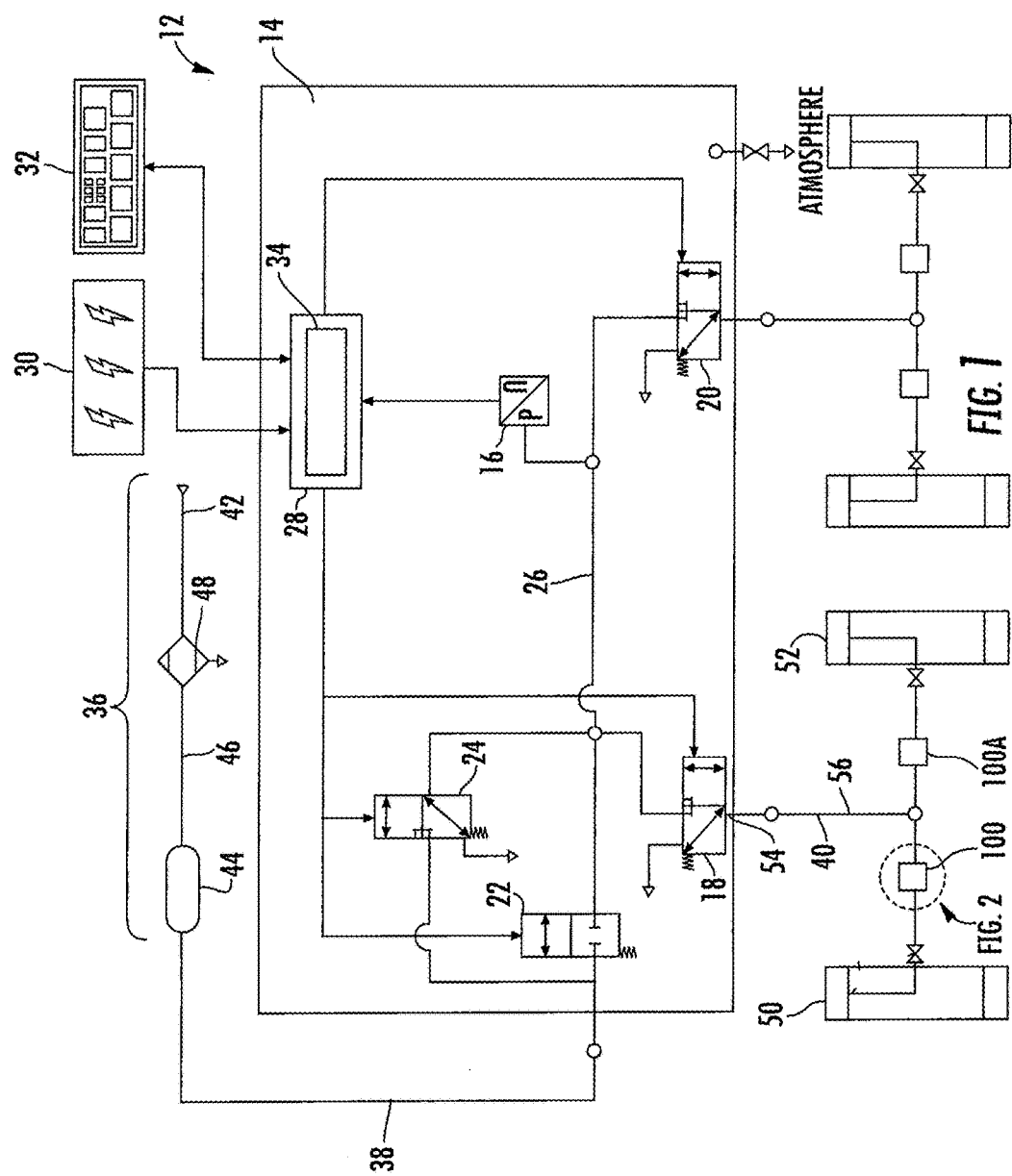
FIG. 1 depicts a schematic view of a tire inflation system according to an embodiment of the presently disclosed subject matter.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of a tire inflation system 12 are described below. In certain embodiments, the tire inflation system 12 is utilized with a vehicle (not depicted). The tire inflation system 12 may be a central tire inflation system (CTIS) for a commercial vehicle. Further, the tire inflation system 12 described herein may have applications in vehicles for both light and heavy duty and for passenger, commercial, and off-highway vehicles. It would be understood by one of ordinary skill in the art that the tire inflation system 12 could have industrial, locomotive, military, and aerospace applications.

A schematic illustration of an embodiment of the tire inflation system 12 is illustrated in FIG. 1. The tire inflation system 12 is described herein with reference to a pressurized fluid such as, for example, air. The tire inflation system 12 may have inflate and/or deflate capability to allow a tire pressure to be increased and/or decreased.

The tire inflation system 12 may comprise a control unit 14. The control unit 14 comprises a pressure sensor 16 for measuring the pressure of air. In an embodiment, the control unit 14 also comprises a plurality of valve assemblies 18, 20, 22, 24, which may be of the solenoid variety, and a first fluid conduit 26 for controlling the flow of and directing air through the system 12.

The control unit 14 also comprises an electronic control portion 28. The electronic control portion 28 may receive input signals from the pressure sensor 16, a power supply 30 and one or more additional sensors (not depicted) such as, for example, a load sensor and a speed sensor. The electronic control portion 28 may also receive input signals from an operator control device 32. The electronic control portion 28 may include a microprocessor 34 operating under the control of a set of programming instructions, which may also be referred to as software. The electronic control portion 28 may include a memory (not depicted) in which programming instructions are stored. The memory can also store identification codes, tire pressure records and/or user inputs over a period of time.

The electronic control portion 28 may output signals to the valve assemblies 18, 20, 22, 24 to open or close the valve assemblies 18, 20, 22, 24. The electronic control portion 28 may also output signals to a display device (not depicted).

The display device may be included as a part of the operator control device 32 or may be included in a freestanding device.

The control unit 14 selectively communicates with an air supply 36 via an air supply circuit 38. The pressure sensor 16 measures the pressure of the air supply 36 via the air supply circuit 38 and the first fluid conduit 26. The control unit 14 may also comprise a control valve assembly 24. The control valve assembly 24 is provided with an orifice which is smaller than the orifice of the supply valve assembly 22 and is utilized to provide a bleed of air from the air supply 36 to a fluid control circuit 40. In an embodiment, the supply valve assembly 22 and control valve assembly 24 are of the solenoid variety as mentioned above.

The air supply 36 is utilized to check the tire pressure and, if needed, increase and/or decrease the tire pressure. The air supply 36 comprises an air compressor 42 attached to the vehicle. In an embodiment, the air supply 36 also comprises a reservoir 44 such as, for example, a wet tank. The compressor 42 is in fluid communication with the reservoir 44 via a supply conduit 46. The air compressor 42 supplies pressurized air to the reservoir 44 for storage therein. Pressurized air from the air supply 36 is provided to the air supply circuit 38 via the reservoir 44. In certain embodiments, a drier 48 is provided for removing water from the air supply 36. A filter (not depicted) may also be interposed in the air supply circuit 38 or the supply conduit 46.

The control unit 14 is also selectively in fluid communication with the fluid control circuit 40. The fluid control circuit 40 is utilized to provide fluid communication between the control unit 14 and one or more tires 50, 52. In an embodiment, fluid communication between the control unit 14 and fluid control circuit 40 is controlled by opening or closing a channel valve assembly 18.

Each tire 50, 52 contains air at a certain pressure which will hereinafter be referred to as tire pressure. In an embodiment, the tire pressure is equal to a target tire pressure. The target tire pressure can be selected to be a desired pressure. After the target tire pressure is selected, it is programmed into the control unit 14. If it is determined that the tire pressure is less than the target tire pressure, the tire pressure can be increased. If it is determined that the tire pressure is greater than the target tire pressure, the tire pressure can be decreased. The tire inflation system 12 will be described below with reference to the tire pressure of one tire 50. However, the tire inflation system 12 may at certain times be in fluid communication with a plurality of tires 50, 52 in order to perform the aforementioned functions.

The fluid control circuit 40 comprises a steer axle wheel end assembly 100 and 100A, and will be described herein with reference to the steer axle wheel end assembly 100. The first steer axle wheel end assembly 100 is associated with a tire 50, and the second steer axle wheel end assembly 100A associated with a tire 52. In an embodiment, the first steer axle wheel end assembly 100 and the second steer axle wheel end assembly 100A are similarly configured. The fluid control circuit 40 may also comprise one or more fluid conduits 54, 56.

Figure 2:
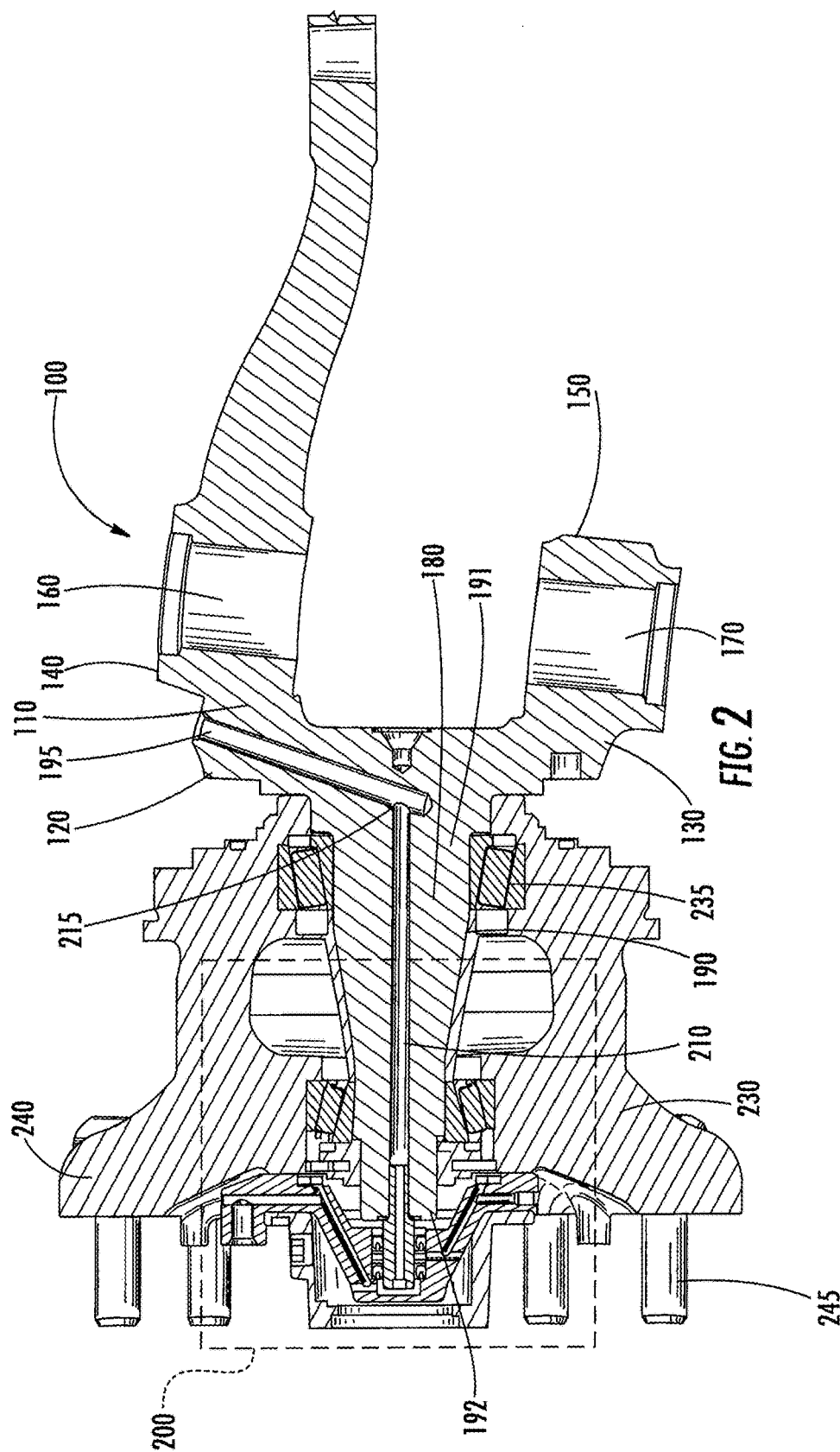
FIG. 2 is a partial cross-sectional view of an embodiment of a portion of the tire inflation system of FIG. 1.

As illustrated in FIG. 2, in an embodiment, the steer axle wheel end assembly 100 comprises a steer axle (not depicted) having an outboard end. The outboard end of the steer axle has a king pin bore (not depicted) extending therethrough. The steer axle wheel end assembly 100 also comprises a knuckle 110 disposed adjacent the outboard end of the steer axle. The knuckle 110 comprises an upper portion 120 and a lower portion 130. The upper portion of the knuckle 120 defines an upper king pin boss 140 and the lower portion of the knuckle 130 defines a lower king pin boss 150. The bosses 140 and 150 are generally vertically aligned with one another. An upper bore 160 extends through the upper king pin boss 140 and a lower bore 170 extends through the lower king ping boss 150. The king pin boss bores 160 and 170 are aligned with the steer axle king pin bore.

The upper and lower king pin boss bores 160 and 170 and the king pin bore receive a king pin (not depicted) therethrough. Bushings (not depicted) may be located within the bores to pivotally support the king pin therein. The king pin pivotally connects the knuckle 110 with the steer axle.

The steer axle wheel end assembly 100 further comprises a spindle 180 coupled to the knuckle 110. The spindle 180 extends from the knuckle 110 in an outboard direction. In the depicted embodiment, the spindle's outer diameter 190 tapers from an inboard end 191 of the spindle to an outboard end 192 of the spindle. The spindle 180 is a non-rotating member of the steer axle wheel end assembly 100 and the rotary joint assembly 200. One or more steer arms or other suspension component connection portions may also be attached or connected to the knuckle 110.

Figure 3:
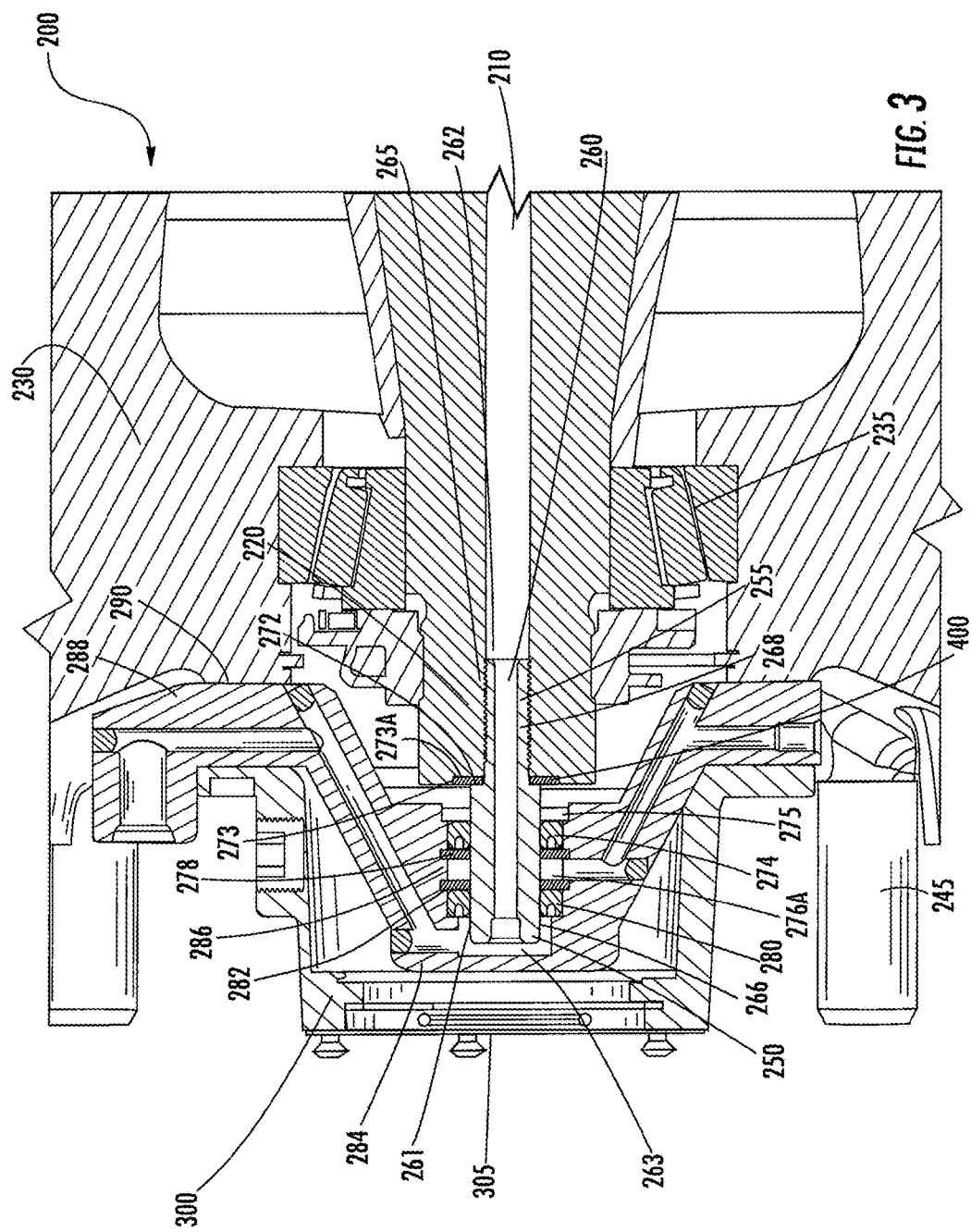
FIG. 3 is an enlarged view of a portion of FIG. 2.
Figure 4:
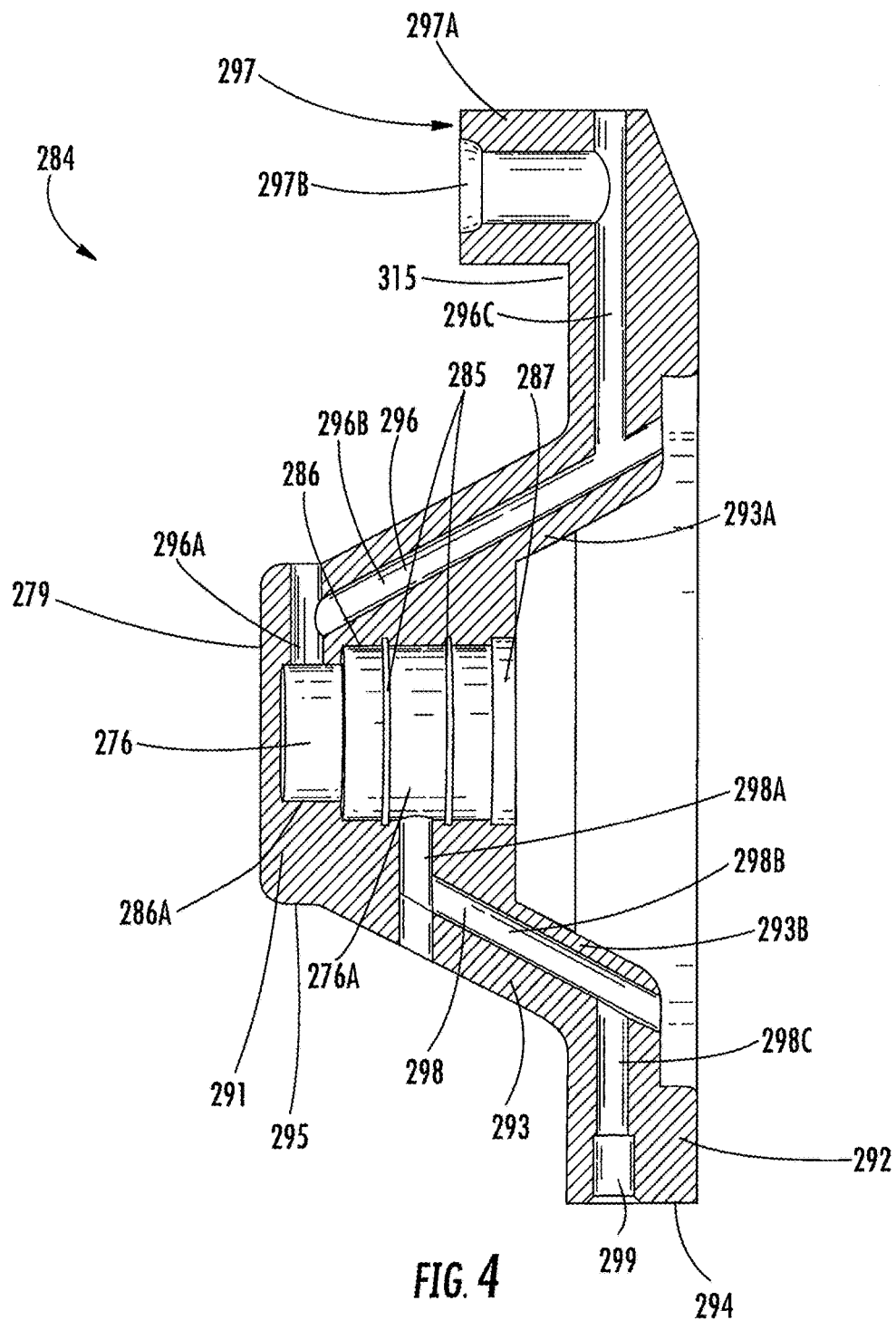
FIG. 4 is a cross-sectional view of a rotary joint air collector ring of the tire inflation system of FIG. 1.
Figure 5:
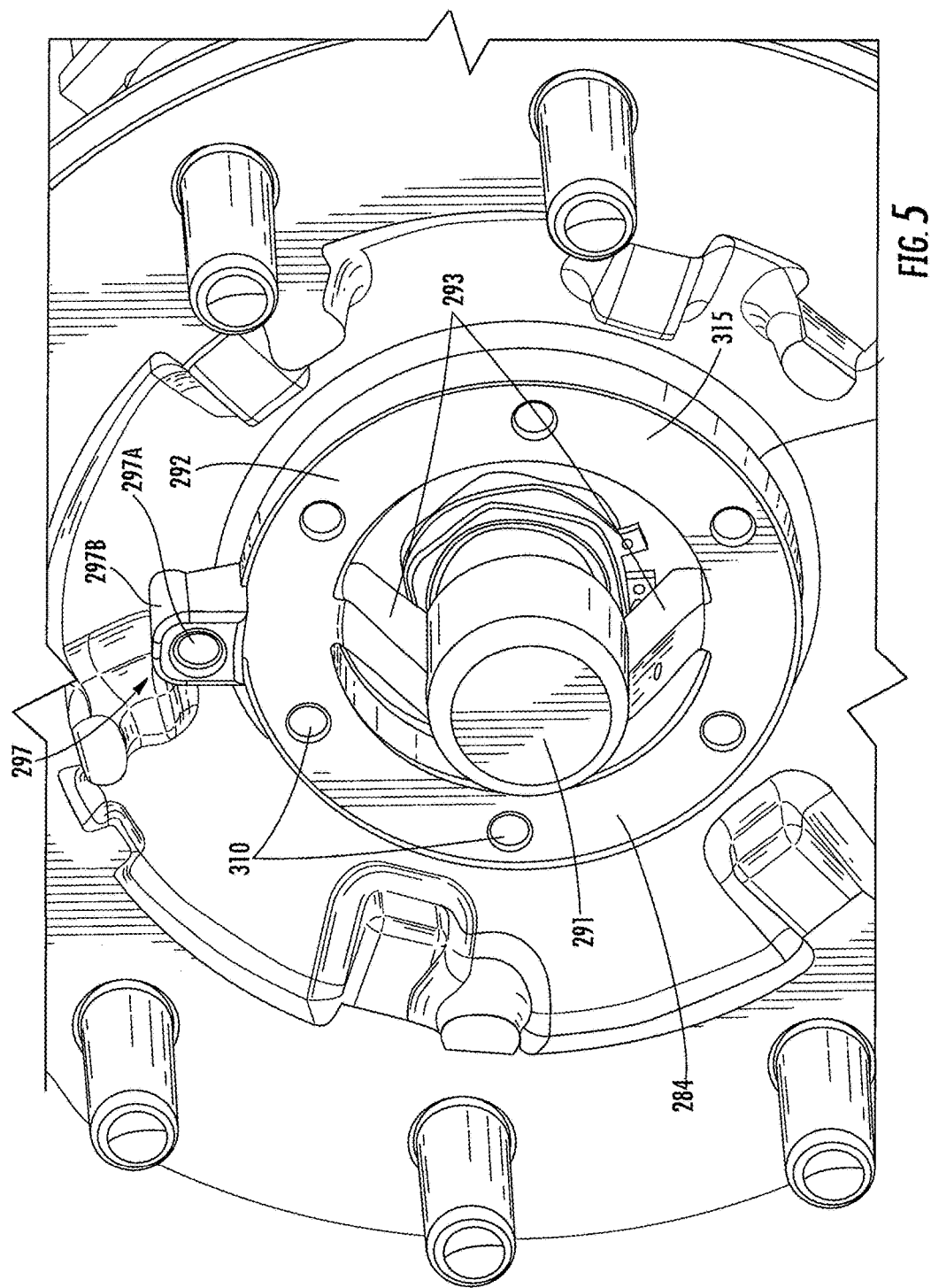
FIG. 5 is a perspective view of a portion of a rotary joint assembly according to an embodiment of the presently disclosed subject matter.
Figure 6:
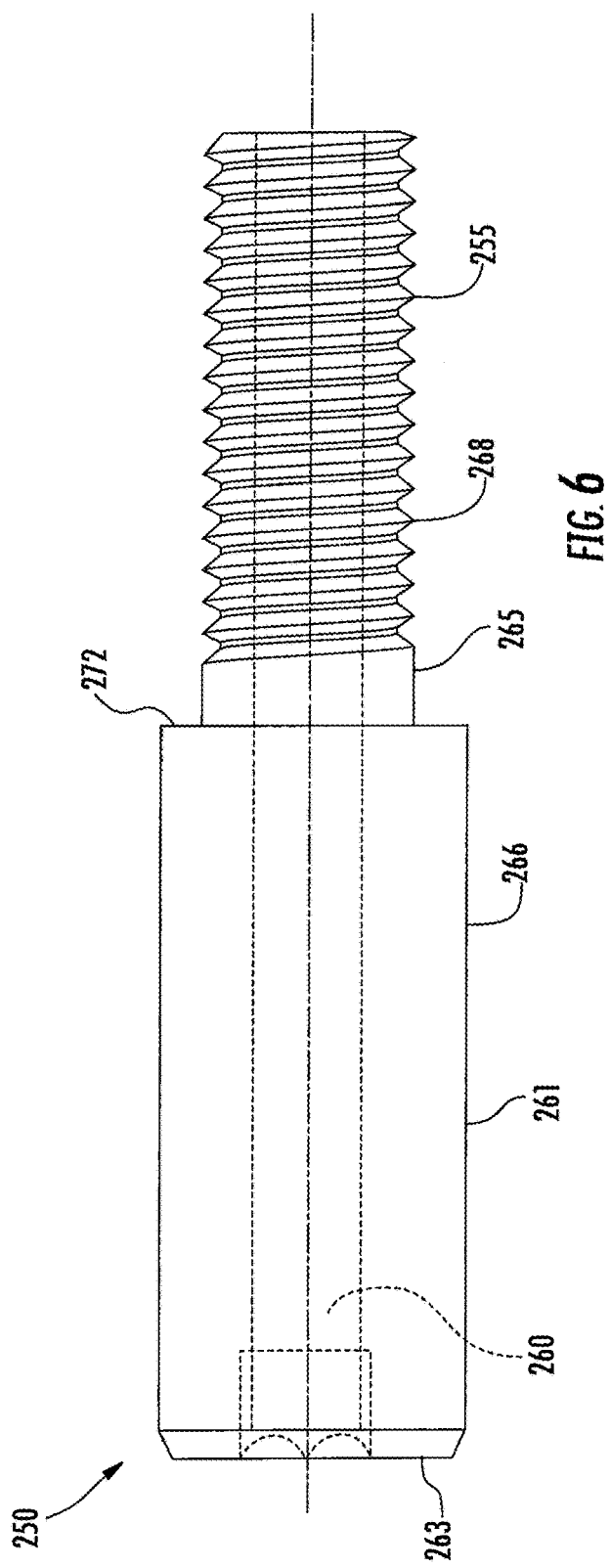
FIG. 6 is a side view of an embodiment of a rotary joint spindle of the tire inflation system of FIG. 1.

A knuckle air passage 195 extends through the steer knuckle 110, where it may begin adjacent to the upper king pin boss 140. The knuckle air passage 195 may extend toward the spindle 180 at a downward angle. As illustrated in FIGS. 2 and 3, the knuckle air passage 195 intersects and is in fluid communication with a spindle air passage 210. In the embodiment depicted, the knuckle air passage 195 intersects the spindle air passage 210 adjacent a first end 215 thereof. In certain embodiments, the knuckle air passage 195 may be provided in a substantially perpendicular relationship with the spindle air passage 210. It should be appreciated that the knuckle air passage 195 and the spindle air passage 210 may also comprise one or more passages at different angles or locations and intersect at different angles and locations in the steer axle wheel end assembly 100. The spindle air passage 210 extends from the inboard end of the spindle 191 toward the outboard end of the spindle 192 parallel to the longitudinal axis of the spindle 180. The spindle air passage 210 comprises a threaded portion 220 disposed at the outboard end of the spindle 192. Further, in an embodiment the spindle air passage 210 may be of a diameter which is substantially constant.

As illustrated in FIGS. 2 and 3, in an embodiment, the steer axle wheel end assembly 100 includes a rotary joint assembly 200. The rotary joint assembly 200 comprises a hub 230 rotatably mounted on and concentric with the spindle 180. A bearing 235 is located between the hub 230 and the spindle 180 to permit the hub 230 to rotate with respect to the spindle 180. At its outboard end, the hub 230 comprises a fastener flange 240. Fasteners 245 are located through the fastener flange 240 for connecting the hub 230 to a wheel assembly (not depicted). The hub 230 may also have a braking surface (not depicted) attached thereto. The braking surface may be provided as a portion of a brake rotor (not depicted) or a brake drum (not depicted). The brake rotor may be attached to the hub 230 and located on the hub 230 inboard of the fasteners 245.

A rotary joint spindle 250 is coupled to the spindle 180 at the spindle's outboard end 192. An inboard portion 255 of the rotary joint spindle 250 is housed within the outboard end of the spindle air passage 210. The rotary joint spindle 250 has an air passage 260 longitudinally aligned with, and in fluid communication with, the spindle air passage 210. The rotary joint spindle air passage 260 extends from the inboard end 262 through the outboard end 263 of the rotary joint spindle 250. In one embodiment, the rotary joint spindle air passage 260 is of a substantially constant diameter in the inboard end 262 and increases in diameter in the outboard end 263. The rotary joint spindle 250 is a non-rotating member of the rotary joint assembly 200.

The inboard portion 255 of the rotary joint spindle 250 comprises a first outer diameter portion 265, and an outboard portion 261 of the rotary joint spindle 250 comprises a second outer diameter portion 266. The second outer diameter portion 266 is of a diameter which is greater than that of the first outer diameter portion 265. The inboard portion 255 of the rotary joint spindle 250 further comprises a threaded portion 268 to engage the spindle air passage threaded portion 220.

A locking washer 400 is disposed around the first outer diameter portion 265 of the rotary joint spindle 250 and abuts an inboard end surface 272 of the second outer diameter portion 266 of the rotary joint spindle 250. Also, the locking washer 400 is positioned in an annular groove 273 formed in the outboard end 192 of the spindle 180 at the outboard end of the spindle air passage 210. The locking washer 400 is provided between the spindle 180 and the rotary joint spindle 250 to provide a seal at an interface of the spindle air passage 210 and the rotary joint spindle 250. More particularly, the locking washer 400 seals the interface between the spindle air passage 210 and the rotary joint spindle 250 at the outboard end of the spindle air passage 210 and the first outer diameter portion 265 of the rotary joint spindle 250 so that pressurized air directed through the spindle air passage 210 is transferred to the rotary joint spindle air passage 260, and vice versa.

Figure 7:
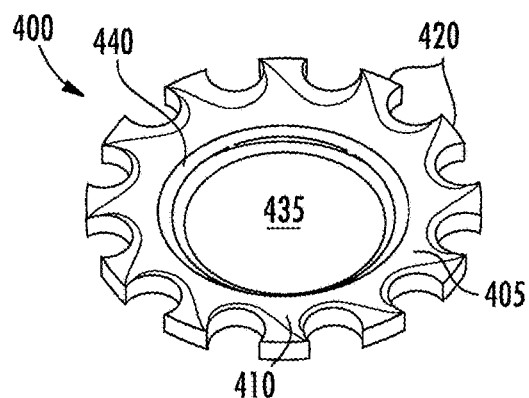
FIG. 7 is a perspective view of an embodiment of a locking washer of the tire inflation system of FIG. 1.
Figure 8:
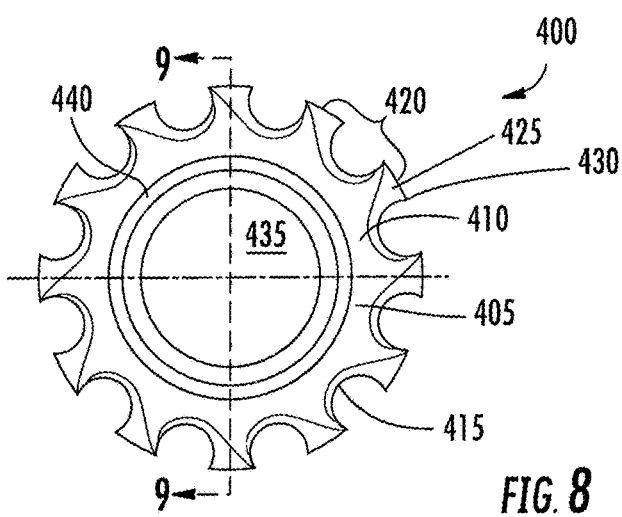
FIG. 8 is a plan view of the locking washer of FIG. 7.
Figure 9:
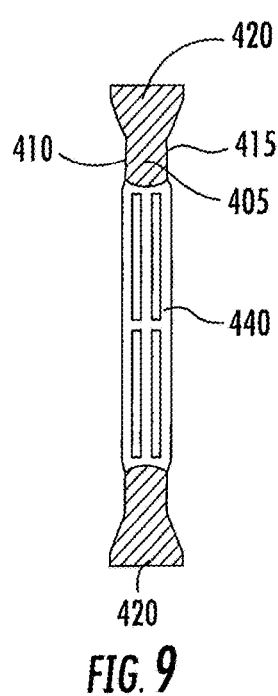
FIG. 9 is a cross-sectional view of the locking washer of FIG. 8 taken along line 9-9.

As illustrated in FIGS. 7-9, the locking washer 400 may be formed from a suitable metal such as aluminum or steel. In an embodiment, the locking washer 400 is a generally annular member. In this embodiment, the locking washer 400 comprises an inner ring 405. The inner ring 405 comprises a first surface 410 and a second surface 415. In another embodiment, the locking washer 400 is of a hollow star shape. In an embodiment, a plurality of teeth 420 are attached to the inner ring 405 and are circumferentially spaced apart therearound. The teeth 420 comprise edges 425, 430 which allow the locking washer 400 to engage oppositely facing surfaces provided on the spindle 180 and the rotary joint spindle 250, respectively. The teeth 420 engage the inboard end surface 272 of the second outer diameter portion 266 and an outboard facing surface 273A of the spindle groove 273 to prevent vibration(s) or other forces from separating the spindle 180 and the rotary joint spindle 250.

The locking washer 400 has an opening 435 formed therein which extends from the first surface 410 to the second surface 415 so that the locking washer 400 can be disposed around the first outer diameter portion 265 of the rotary joint spindle 250. The opening 435 is defined by a sealing portion 440 of the locking washer 400.

The sealing portion 440 comprises an elastomeric material. In certain embodiments, the elastomeric materials are lubricant and moisture resistant. In an embodiment, the elastomeric material is bonded to the inner ring 405 via molding or another suitable process. The elastomeric material may be bonded to the inner ring 405 in such a manner that an annular portion of the first surface 410 and the second surface 415 is covered by the elastomeric material. The elastomeric material is utilized to provide a seal which seals the interface between the spindle air passage 210 and the rotary joint spindle 250 at the outboard end of the spindle air passage 210 and the first outer diameter portion 265 of the rotary joint spindle 250. In an embodiment, the elastomeric material on the first surface 410 seals against a portion of the inboard end surface 272 of the second outer diameter portion 266 and the elastomeric material on the second surface 415 seals against a portion of the outboard facing surface 273A of the spindle groove 273 to prevent pressurized air from leaking between the spindle air passage 210 and the rotary joint spindle 250.

Although the locking washer 400 has been described for use in helping to maintain the position of two non-rotating members of a tire inflation system relative to each other and helping seal an interface therebetween, it should be appreciated that the locking washer 400 may be utilized in other applications (not depicted). For example, the locking washer 400 may be utilized in a similar manner in a hydraulic system or another like system utilized to transfer a pressurized fluid.

In certain embodiments of the rotary joint assembly 200, the locking washer 400 may be replaced with a non-locking sealing washer (not depicted). In an embodiment, the rotary joint assembly 200 does not comprise the locking washer 400, and instead the rotary joint assembly 200 comprises a Loctite® Dri-Loc® Threadlocker (not depicted), a product of the Henkel Corporation who's United States headquarters is located at One Henkel Way, Rocky Hill, Conn. 06067. The Loctite® Dri-Loc® Threadlocker is located on the threaded portion 268 of the rotary joint spindle 250. In another embodiment, the rotary joint assembly 200 does not comprise the locking washer 400, and instead the rotary joint assembly 200 comprises a thread sealant (not depicted) located on the threaded portion 268 of the rotary joint spindle 250. In yet another embodiment, the rotary joint assembly 200 comprises the locking washer 400, the Loctite® Dri-Loc® Threadlocker, and the thread sealant. In still another embodiment, the rotary joint assembly 200 comprises the non-locking sealing washer, the Loctite® Dri-Loc® Threadlocker, and the thread sealant. In another embodiment the rotary joint assembly 200 comprises the locking washer 400 and the Loctite® Dri-Loc® Threadlocker. In yet another embodiment the rotary joint assembly 200 comprises the non-locking sealing washer and the Loctite® Dri-Loc® Threadlocker. In still another embodiment the rotary joint assembly 200 comprises the locking washer 400 and the thread sealant. In an additional embodiment, the rotary joint assembly 200 comprises the non-locking washer and the thread sealant.

The rotary joint assembly 200 may also comprise an annular locating washer 275 disposed around the second outer diameter portion 266 of the rotary joint spindle 250. The locating washer 275 may be utilized to secure the location of a rotary oil seal 274 disposed around the second outer diameter portion 266 of the rotary joint spindle 250. A snap ring 278 disposed around the second outer diameter portion 266 of the rotary joint spindle 250 may also be utilized to ensure the location of the rotary oil seal 274. The rotary joint assembly 200 further comprises a rotary air seal 280 disposed around the second outer diameter portion 266 of the rotary joint spindle 250. A snap ring 282 disposed around the second outer diameter portion 266 of the rotary joint spindle 250 may be utilized to ensure the location of the rotary air seal 280. The snap rings 278 and 282 may be secured in grooves 285 formed in an inner surface 286 of a rotary joint air collector ring 284. The rotary oil seal 274 and the rotary air seal 280 help prevent, or reduce, oil leakage and air leakage, respectively, into an annular vent chamber 276A defined between the inner surface 286 of the rotary joint air collector ring 284 and the second outer diameter portion 266 of the rotary joint spindle.

An area between the locating washer 275 and the outboard end 192 of the spindle 180 contains a lubricant (not depicted) utilized to lubricate the bearing 235. To avoid over-pressurization of a bearing 235 seal, it is preferred that pressurized air from the tire inflation system 12 does not enter the area between the locating washer 275 and the outboard end 192 of the spindle 180. In an embodiment, the bearing 235 seal is provided inboard of the bearing 235.

As illustrated in FIGS. 2, 3, 4, and 5, in an embodiment the rotary joint air collector ring 284 is generally annular and rotatably disposed about the rotary joint spindle 250. The rotary oil seal 274 and the rotary air seal 280 both seal against the inner surface 286 of the rotary joint air collector ring 284. In an embodiment, an inboard surface 288 of the rotary joint air collector ring 284 abuts an outboard surface 290 of the hub 230.

In an embodiment the rotary joint air collector ring 284 comprises a first portion 291 connected to a second portion 292 by a third portion 293. The third portion 293 may be a rib-like member including an arcuate or straight geometry. The first portion 291 is generally cylindrical in shape and comprises an outboard cap 279. In an embodiment, the first portion 291 comprises a first inner surface 286 and a second inner surface 286A, where the first inner surface 286 is of a greater diameter than the second inner surface 286A. As stated above, the first inner surface 286 may comprise the annular grooves 285 for securing the snap rings 278 and 282 to the rotary joint air collector ring 284. The first inner surface 286 may also comprise an annular groove 287 for securing the locating washer 275 to the rotary joint air collector ring 284. The second portion 292 is generally annular in shape and comprises fastener holes 310. An outer diameter 294 of the second portion 292 is greater than an outer diameter 295 of the first portion 291. The first inner surface 286 and the second inner surface 286A define air chamber 276.

The air chamber 276 is in fluid connection with a first air channel 296. In an embodiment, the first air channel 296 comprises a first conduit 296A, a second conduit 296B, and a third conduit 296C. The first conduit 296A is oriented in the first portion 291 and comprises a longitudinal axis generally oriented perpendicular to the longitudinal axis of the rotary joint spindle 250. The first conduit 296A is connected to and in fluid communication with air chamber 276 and second conduit 296B. The second conduit 296B is disposed through the third portion 293 and comprises a longitudinal axis disposed obliquely to the longitudinal axis of the first portion 291. The second conduit 296B is connected to and in fluid communication with the first conduit 296A and the third conduit 296C. The third conduit 296C is disposed in the second portion 292 and comprises a longitudinal axis oriented parallel to the longitudinal axis of the first conduit 296A. The third conduit 296C intersects and is in fluid connection with a port 297.

The port 297 comprises a port member 297A and a port opening 297B. The port member 297A is coupled to the outer diameter 294 of the second portion 292 of the rotary joint air collector ring 284. In an embodiment, the port member 297A and the rotary joint air collector ring 284 comprise a unitary module. The port member 297A may comprise a longitudinal axis parallel to the longitudinal axis of the second portion 292. In an embodiment, the port member 297A extends beyond an outboard surface 315 of the second portion 292. The port opening 297B is in fluid communication with the third conduit 296C and is capable of connecting in fluid communication with a fluid-transfer module (not depicted) or a wheel valve assembly. In an embodiment, the port opening 297B is capable of coupling with a tire air hose (not depicted).

If the rotary air seal 280 fails and pressurized air passes from the air chamber 276 to the vent chamber 276A, the pressurized air will pass into a second air channel 298. The second air channel 298 intersects and is in fluid communication with the vent chamber 276A and comprises a first vent passage 298A, a second vent passage 298B, and a third vent passage 298C. The first vent passage 298A is oriented in the first portion 291 and comprises a longitudinal axis generally oriented perpendicular to the longitudinal axis of the rotary joint spindle 250. The first vent passage 298A is connected to and in fluid communication with the vent chamber 276A and the second vent passage 298B. The second vent passage 298B is disposed through the third portion 293 and comprises a longitudinal axis disposed obliquely to the longitudinal axis of the first portion 291. The second vent passage 298B is connected to and in fluid communication with the first vent passage 298A and the third vent passage 298C. The third vent passage 298C is disposed in the second portion 292 and comprises a longitudinal axis oriented parallel to the longitudinal axis of the first vent passage 298A. The third vent passage 298C is connected to and in fluid communication with the second vent passage 298B and a vent opening 299 disposed in the outer diameter 294 of the second portion 292 of the rotary joint air collector ring 284. The rotary joint air collector ring 284 allows compressed air that escapes via the rotary air seal 280 to vent to the atmosphere by way of the vent opening 299, and the rotary oil seal 274 prevents compressed air from entering the hub 230.

In an embodiment, third portion 293 comprises arms 293A and 293B. It must be noted that third portion 293 may comprise any component that defines, contains, or abuts the air channels 296 and 298, connected to and in fluid communication with the air chamber 276 and the vent chamber 276A, the port 297 and the vent opening 299. In an embodiment (not depicted), the third portion 293 comprises a conical shape connecting the first portion 291 and the second portion 292. In an embodiment, the first and second air channels 296 and 298 comprise diameters equal to or greater than the diameter of the rotary joint spindle air passage 260. In another embodiment, the first and second air channels 296 and 298 comprise diameters less than or equal to the diameter of the rotary joint spindle air passage 260.

In an embodiment, the rotary joint air collector ring 284 and the rotary joint spindle 250 are not in direct contact. The rotary joint air collector ring 284 and the rotary joint spindle 250 are in fluid communication via the air chamber 276. The first air channel 296 is in fluid communication with a wheel valve (not depicted) or a tire (not depicted) by way of the port 297 coupled with an air conduit (not depicted).

The rotary joint air collector ring 284 may be manufactured out of any material, having the necessary characteristics to enable its function in the rotary joint assembly 200 for a variable length of time, including but not limited to aluminum, aluminum alloy, steel, iron, titanium, carbon fiber, polymer materials or any combination thereof. The rotary joint air collector ring 284 may be manufactured using additive manufacturing processes, machining, casting, forging, any other suitable method, or a combination of any suitable methods. In an embodiment, the first portion 291, the second portion 292, and the third portion 293 of the rotary joint air collector ring 284 are machined from a billet. The first and second air channels 296 and 298 may be produced by drilling through the first portion 291, second portion 292, and third portion 293. Where the drill holes breach the outer diameter of the first portion 295, the outer diameter 294 of the second portion 292, the outer surface of the third portion 293, or the inboard surface of the rotary joint air collector ring 288, the holes may be welded closed, plugged, or a combination thereof.

In an embodiment, the rotary joint air collector ring 284 is coupled to a hub cap 300 by one or more fasteners (not depicted), where the fasteners (not depicted) are of a suitable length to attach both the hub cap 300 and the rotary joint air collector ring 284 to the hub 230. Additionally, the hub cap 300 may partially house the rotary joint air collector ring 284. Furthermore, the hub cap 300 and the rotary joint air collector ring 284 rotate with the hub 230. The hub cap 300 may be of any configuration or production. In an embodiment the hub cap 300 comprises a pressure relief mechanism (not depicted) to relieve any pressure increase adjacent bearing 235. The pressure relief mechanism may be located in end portion 305 of the hub cap 300, and may be of the rubber plug or diaphragm variety.

While various embodiments have been described above, it should be understood that they have been presented by way of example, and not limitation. It will be apparent to persons skilled in the relevant art(s) that the disclosed subject matter may be embodied in other specific forms without departing from the spirit or essential characteristics thereof. The embodiments described above are therefore to be considered in all respects as illustrative—not restrictive.

What is claimed is:

1. An assembly for a tire inflation system, comprising:
a spindle including a fluid conduit therethrough,
a rotary joint spindle coupled with said spindle, said rotary joint spindle having a fluid conduit therethrough in fluid communication with said spindle fluid conduit,
a hub rotatably disposed about said spindle,
a fluid collector ring coupled with said hub for rotation therewith, wherein said fluid collector ring is rotatably disposed at least partially about said rotary joint spindle, said fluid collector ring comprises:
  a first portion having an outer surface and an inner surface, said inner surface at least partially defining a first chamber,
  an annular second portion having an outer surface and an interior surface, wherein said second portion outer surface has a greater diameter than a diameter of said first portion outer surface, and
  a port disposed on an outboard side of said second portion, said first chamber in fluid communication with said port via a first conduit disposed through said first portion and said second portion;
a hub cap coupled with an outboard surface of said fluid collector ring for rotation therewith, wherein said hub cap at least partially surrounds said fluid collector ring; and
a locking washer disposed around an inboard portion of said rotary joint spindle, said locking washer is positioned in an annular groove in an outboard end of said spindle, and said locking washer sealingly engages oppositely facing surfaces provided on said spindle and said rotary joint spindle.

2. The assembly for the tire inflation system of claim 1, wherein said fluid collector ring further includes a vent to atmosphere, said first portion outer surface coupled with said second portion via at least one member, said first chamber in fluid communication with said vent via a second conduit disposed through said first portion, one of said at least one member, and said second portion.

3. The assembly for the tire inflation system of claim 2, wherein said vent to atmosphere is disposed on said second portion outer surface.

4. The assembly for the tire inflation system of claim 2, wherein at least one of said at least one member includes a longitudinal centerline, and said longitudinal centerline is disposed obliquely to a centerline of said first portion.

5. The assembly for the tire inflation system of claim 1, wherein an outboard end of said spindle fluid conduit includes a threaded portion, and said rotary joint spindle comprises a threaded inboard portion engaged therewith.

6. The assembly for the tire inflation system of claim 1, wherein said locking washer includes a plurality of teeth positioned on an outer portion thereof, said teeth engaging said outboard end of said spindle; and said locking washer includes a sealing portion sealingly engaged with said inboard portion of said rotary joint spindle.

7. The assembly for the tire inflation system of claim 1, wherein a first rotary seal and a second rotary seal are sealingly disposed about an outboard portion of said rotary joint spindle, wherein said first rotary seal, said second rotary seal, and said fluid collector ring define a second chamber within said first chamber, and wherein said second chamber is in fluid communication with a vent to atmosphere in said fluid collector ring.

8. The assembly for the tire inflation system of claim 7, wherein said fluid collector ring includes a first and second groove in an interior surface thereof, a first snap ring is disposed in said first groove, and a second snap ring disposed in said second groove; and said first and second snap rings aid in locating said first rotary seal and said second rotary seal.

9. The assembly for the tire inflation system of claim 1, wherein a first rotary seal is sealingly disposed about an outboard portion of said rotary joint spindle, said first rotary seal and said fluid collector ring define a third chamber within said first chamber, wherein said third chamber is in fluid communication with said rotary joint spindle fluid conduit and said port in said fluid collector ring.

10. The assembly for the tire inflation system of claim 9, wherein said port is in fluid communication with a wheel valve assembly.

11. The assembly for the tire inflation system of claim 7, wherein a lubricant chamber is defined by said hub, said hub cap and said second rotary seal sealingly engaged with said rotary joint spindle and said fluid collector ring.

12. An assembly for a tire inflation system, comprising:
a spindle including a fluid conduit therethrough,
a rotary joint spindle coupled with said spindle, said rotary joint spindle having a fluid conduit therethrough in fluid communication with said spindle fluid conduit,
a hub rotatably disposed about said spindle,
a fluid collector ring coupled with said hub for rotation therewith, wherein said fluid collector ring is rotatably disposed at least partially about said rotary joint spindle, said fluid collector ring comprises:
  a first portion having an outer surface and an inner surface, said inner surface at least partially defining a first chamber,
  an annular second portion having an outer surface and an interior surface, wherein said second portion outer surface has a greater diameter than a diameter of said first portion outer surface, and
  a port disposed on an outboard side of said second portion, said first chamber in fluid communication with said port via a first conduit disposed through said first portion and said second portion; and a first groove and a second groove in an interior surface thereof, a first snap ring is disposed in said first groove, and a second snap ring disposed in said second groove;

a hub cap coupled with an outboard surface of said fluid collector ring for rotation therewith, wherein said hub cap at least partially surrounds said fluid collector ring;

a first rotary seal and a second rotary seal, wherein each of said first rotary seal and said second rotary seal are sealingly disposed about an outboard portion of said rotary joint spindle, wherein said first rotary seal, said second rotary seal, and said fluid collector ring define a second chamber within said first chamber, wherein said second chamber is in fluid communication with a vent to atmosphere in said fluid collector ring, and wherein said first and second snap rings aid in locating said first rotary seal and said second rotary seal.

* * * * *